United States Patent [19]

Brugerolle et al.

[11] Patent Number: 4,964,886
[45] Date of Patent: Oct. 23, 1990

[54] PROCESS AND EQUIPMENT FOR SEPARATING A COMPONENT OF INTERMEDIATE PERMEABILITY FROM A GASEOUS MIXTURE

[75] Inventors: Jean-Renaud Brugerolle; Laurent Ferenczi, both of Paris, France

[73] Assignee: L'Air Lquide, Societe Anonyme pour l'etude et l'Exploitation des Procedes Georges Claude, Paris, France

[21] Appl. No.: 404,453

[22] Filed: Sep. 8, 1989

[30] Foreign Application Priority Data

Sep. 8, 1988 [FR] France ................ 88 11736

[51] Int. Cl.⁵ ........................................ B01D 53/22
[52] U.S. Cl. ........................................ 55/16; 55/68; 55/158
[58] Field of Search .................... 55/16, 68, 158

[56] References Cited

U.S. PATENT DOCUMENTS

| | | | |
|---|---|---|---|
| 1,496,757 | 6/1924 | Lewis et al. | 55/16 |
| 3,144,313 | 8/1964 | Pfefferle | 55/16 |
| 3,241,293 | 3/1966 | Pfefferle | 55/16 |
| 3,250,080 | 5/1966 | Garwin | 62/24 |
| 3,339,341 | 9/1967 | Maxwell et al. | 55/158 X |
| 3,442,002 | 5/1969 | Geary, Jr. et al. | 55/158 X |
| 3,735,558 | 5/1973 | Skarstrom et al. | 55/16 |
| 4,119,417 | 10/1978 | Heki et al. | 55/16 X |
| 4,130,403 | 12/1978 | Cooley et al. | 55/16 |
| 4,140,499 | 2/1979 | Ozaki et al. | 55/158 |
| 4,264,338 | 4/1981 | Null | 55/16 |
| 4,435,191 | 3/1984 | Graham | 55/16 |
| 4,478,719 | 10/1984 | Michele et al. | 55/16 X |
| 4,597,777 | 7/1986 | Graham | 55/16 |
| 4,701,187 | 10/1987 | Choe et al. | 55/16 |

FOREIGN PATENT DOCUMENTS

| | | |
|---|---|---|
| 0029600 | 6/1981 | European Pat. Off. |
| 2053021 | 2/1981 | United Kingdom |
| 2139110 | 11/1984 | United Kingdom ................ 55/16 |

Primary Examiner—Robert Spitzer

[57] ABSTRACT

The separation of a gaseous mixture of at least three components, by permeation, wherein a more permeable component, e.g. hydrogen, is separated from an intermediately permeable component and a less permeable component, e.g. $CO_2$ and CO, respectively, in a first permeator. The residue from the first permeator, e.g. $CO_2$ and CO, is introduced into a second permeator in which the intermediately permeable component, e.g. $CO_2$, is separated from the less permeable component, e.g. CO. The less permeable component, e.g. CO, is then directly and completely introduced into the downstream side of the first permeator, where it rejoins the more permeable component, e.g. $H_2$. The partial pressure of the more permeable component in the starting gaseous mixture, e.g. $H_2$, is maintained higher than its partial pressure in the final mixture of e.g. $H_2$ and CO.

9 Claims, 1 Drawing Sheet

PROCESS AND EQUIPMENT FOR SEPARATING A COMPONENT OF INTERMEDIATE PERMEABILITY FROM A GASEOUS MIXTURE

BACKGROUND OF INVENTION (1) Field of the Invention

The present invention concerns a process for separating a component of intermediate permeability from a gaseous mixture. The invention is particularly applicable to the removal of $CO_2$ from a hydrogen-carbon dioxide ($CO_2$)-carbon monoxide(CO) mixture.

(2) Description of Prior Art

The standard technique for carrying out such removal consists in washing the mixture, either by means of amines (chemical washing), or by means of products having an absorption "physical behavior". This leads to substantial investment and consumption of energy.

The document US.-A- 3.250.080 describes a process of separating a gaseous mixture by diffusion and fractionation utilising a train of permeation cells mounted in series on the high pressure side as well as on the low pressure side and a portion of the residual gas from the high pressure outlet end is circulated towards the low pressure inlet end of the cells.

Such equipment is particularly complex.

The documents G.B.-A- No. 2.053.021 and EP-A- No. 0.029.600 also describe systems for separating a gas derived from a high pressure compartment of a membrane separator towards the low pressure compartment There is no treatment during this recycling.

SUMMARY OF INVENTION

The purpose of the invention is to provide a technique of separation which is very simple and very economical.

For this purpose, the process according to the invention is characterized in that:

the mixture is allowed to pass in the entrance zone of a permeator;

the residue obtained from this permeator is treated by eliminating said component therefrom, so as to produce an intermediate gaseous flow; and this gaseous flow is injected into the production zone of the permeator, the partial pressure of a more permeable component of said mixture being maintained by said treatment, at the outlet of the production zone of the permeator, at a lower value than that of said component in the starting mixture.

According to a preferred embodiment of the invention, said component is removed by permeation into a second permeator whose residue constitutes the intermediate gaseous flow.

It is also an object of the invention to provide an equipment intended for the operation of such process. This equipment is characterized in that it comprises:

a permeator whose inlet zone is connected to a source of said mixture;

a device for treating the residue from this permeator comprising means for removing said component; and means for injecting an effluent from this device in the production zone of the permeator, the treating device comprising means to maintain the partial pressure of a more permeable component of said mixture at the outlet of the production zone of the permeator to a lower value than that of this component in the starting mixture.

BRIEF DESCRIPTION OF DRAWINGS

A few examples for carrying out the invention will now be described with reference to the annexed drawing in which.

DESCRIPTION OF PREFERRED EMBODIMENTS

Figure 1:
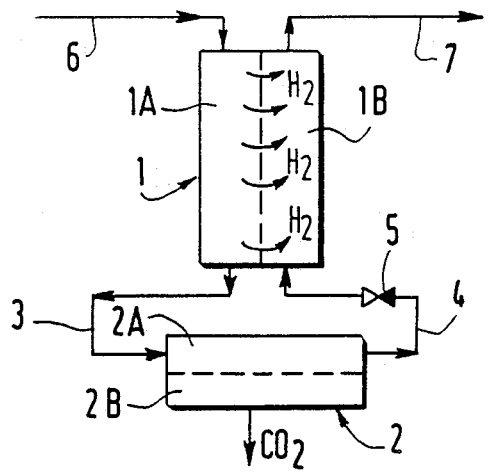
FIG. 1 is a schematic illustration of an equipment according to the invention.

The equipment represented in FIG. 1 is intended to supply under a mean pressure, a mixture of hydrogen and carbon monoxide from a gaseous mixture consisting essentially of hydrogen, carbon monoxide and $CO_2$. This equipment comprises a first permeator 1 including a high pressure inlet zone 1A and a mean pressure production zone 1B, and a second permeator 2 including a high pressure zone 2A and low pressure zone 2B. Zones 1A and 1B are connected together by means of a first duct 3, zones 2A and 1B are connected together by means of a second duct 4 provided with an expansion valve 5.

Permeator 1 is adapted to separate hydrogen from the other components of the mixture which is introduced, for example by means of a network of hollow fibres consisting of a membrane of selective permeability Such permeators are commercially available.

Also, permeator 2 is adapted to separate $CO_2$ from other components of the mixture which is introduced therein, for example by means of a network of hollow fibres consisting of a membrane of selective permeability. Such permeators are also commercially available.

In operation, the starting mixture is introduced under low pressure in zone 1A by means of a duct 6 and undergoes a first permeation during which the hydrogen present therein goes into zone 1B. The residue from this permeation, essentially consisting of a mixture of carbon monoxide and $CO_2$, goes into zone 2A and undergoes a second permeation during which $CO_2$ goes into zone 2B. The residue from this second permeation, essentially consisting of carbon monoxide present in the initial mixture, is expanded in valve 5 and sent to zone 1B. There, carbon monoxide is mixed with hydrogen from the first permeation, which constitutes at the production outlet of the permeator 1, via duct 7, a mixture of hydrogen and carbon monoxide under mean pressure. In order for this operation to be possible, it is only sufficient that the partial pressure of hydrogen be lower in the final mixture than in the initial mixture. Thus, with an initial mixture of 60% hydrogen under 35 bars, the partial pressure of hydrogen is 21 bars. It is therefore possible, for example, to supply a mixture of hydrogen and carbon monoxide at 80% hydrogen under 20 bars, while the partial pressure of hydrogen in such a mixture is 16 bars.

As indicated in FIG. 1, the circulation of the two gaseous flows in the permeator 1 can advantageously be carried out in counter-current.

Figure 2:
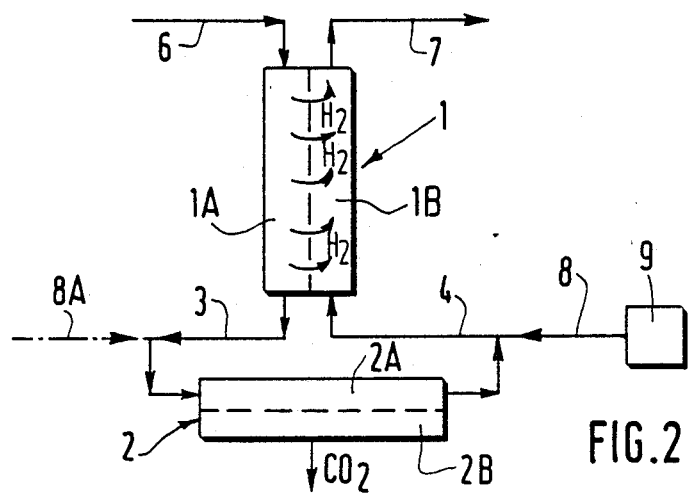
FIG. 2 illustrates a variant of an equipment according to the invention.

The equipment of FIG. 2 differs from that of FIG. 1 only in that the expansion valve 5 is removed while a duct 8 connected to a source 9 of auxiliary gas ends in duct 4. The auxiliary gas contains little or no hydrogen and $CO_2$ and consists for example of methane, carbon monoxide and/or nitrogen.

The injection of the auxiliary gas in the duct 4 enables the permeated product from permeator 1 to be diluted, which results, without noticeable lowering of the total partial pressure, a reduction of the partial pressure of hydrogen in zone 1B. Thus, while taking into account of the losses of charge, an initial mixture containing 60% hydrogen, 20% $CO_2$ and 20% CO under 35 bars can give under 32 bars a mixture containing 50% hydrogen (i.e. a partial pressure of hydrogen of 16 bars), 15% CO and 35% auxiliary gas. This variant can even give in duct 7, mixtures at a total pressure higher than the initial pressure.

According to a variant, as indicated in chain-dotted line, the above-mentioned dilution can be carried out upstream of the permeator 2, by means of a duct 8A opening in the duct 3, if the auxiliary gas contains $CO_2$.

Figure 3:
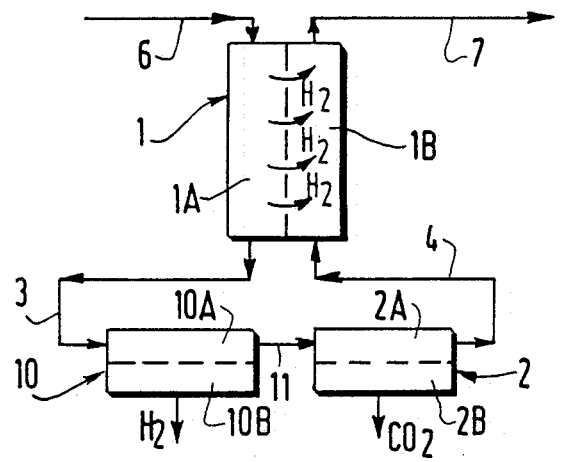
FIG. 3 illustrates another variant.

The equipment represented in FIG. 3 differs from that of FIG. 1 by the fact that the expansion valve 5 has been removed, while an intermediate permeator 10 provided with hydrogen separation membranes is mounted between permeators 1 and 2. More specifically, duct 3 opens in the high pressure zone 10A of permeator 10, which zone is connected by a duct 11 to the high pressure space 2A of permeator 2.

In operation, a portion only of the hydrogen present in the initial mixture is permeated in zone 1B, the remaining hydrogen being removed by permeation in the low pressure zone 10B of intermediate permeator 10. This removal of a portion of the hydrogen enables again to reduce the partial pressure of hydrogen in space 1B and, thereafter, to produce a mixture $H_2/CO$ without noticeable pressure decrease.

As a variant, if it is not required to produce low pressure hydrogen, the permeator 10 may be removed. Indeed, the membranes which are permeable to $CO_2$ also allow hydrogen to pass therethrough, so that with an appropriate adjustment of the parameters, the permeator 2 can ensure by itself the removal of the excess hydrogen and that of $CO_2$.

The equipments of FIGS. 2 and 3 are particularly suitable to the production of a mixture of hydrogen and carbon monoxide from a hydrocarbon cracking or reforming gas in which a ratio of hydrogen to carbon monoxide is higher than required.

In all cases, the complete removal of $CO_2$ requires a chemical or physical washing of the final mixture. This washing will only require small investment and energy output since the essential portion of $CO_2$ will previously have been eliminated by permeation.

It should be noted that the invention is essentially applicable to the removal of $CO_2$ by permeation, which is not possible as such, since the permeators allow hydrogen to simultaneously pass therethrough. However, the invention also permits savings when the permeator 2 is replaced by another type of device for removing $CO_2$, for example by washing with amines. As a matter of fact, the flow treated with this device is considerably reduced.

We claim:

1. Process for separating a component of intermediate permeability from a gaseous mixture including also at least a more permeable component and a less permeable component, comprising introducing a said mixture into an upstream side of a first permeator having an upstream side and a downstream side, introducing residue from said upstream side into an upstream side of a second permeator having an upstream side and a downstream side, removing said component of intermediate permeability from the downstream side of said second permeator, introducing a residue from the upstream side of said second permeator substantially directly and totally into the downstream side of said first permeator, withdrawing from the downstream side of said second permeator a mixture of said more and less permeable components, and maintaining the partial pressure of said more permeable component in said mixture in said upstream side of said first permeator higher than the partial pressure of said more permeable component in said downstream side of said first permeator.

2. A process as claimed in claim 1, and expanding said residue withdrawn from said upstream side of said second permeator prior to introducing the same into said downstream side of said first permeator.

3. A process as claimed in claim 1, and adding an auxiliary gas to said residue withdrawn from said upstream side of said second permeator prior to introducing the same into said downstream side of said first permeator.

4. A process as claimed in claim 1, and introducing said residue from said upstream side of said first permeator into an upstream side of an intermediate permeator having an upstream and a downstream side, said intermediate permeator being intermediate said first and second permeators, removing from said downstream side of said intermediate permeator an excess of said more permeable component, and introducing a residue from said upstream side of said intermediate permeator into said upstream side of said second permeator.

5. A process as claimed in claim 1, wherein said more permeable and intermediate and less permeable components are respectively hydrogen, $CO_2$ and CO.

6. Apparatus for separating a component of intermediate permeability from a gaseous mixture including also at least a more permeable component and a less permeable component, said apparatus comprising a first permeator having an upstream side and a downstream side and a second permeator having an upstream side and a downstream side, means for introducing a said gaseous mixture into said upstream side of said first permeator, means for introducing a residue from said upstream side of said first permeator into said upstream side of said second permeator, means for withdrawing from said downstream side of said second permeator a stream of said component of intermediate permeability, means for withdrawing from said upstream side of said second permeator a residue comprising said less permeable component and for introducing the same substantially directly and totally into said downstream side of said first permeator, and means for maintaining the partial pressure of said more permeable component in said mixture in said upstream side of said first permeator higher than the partial pressure of said more permeable component in said downstream side of said first permeator.

7. Apparatus as claimed in claim 6, and means for expanding said residue removed from said upstream side of said second permeator prior to the introduction thereof into said downstream side of said first permeator.

8. Apparatus as claimed in claim 6, and means for injecting an auxiliary gas into said stream of less permeable component which flows as residue from said upstream side of said second permeator to said downstream side of said first permeator.

9. Apparatus as claimed in claim 6, and an intermediate permeator between said first and second permeators, said intermediate permeator having an upstream side and a downstream side, means for introducing said residue from said upstream side of said first permeator into said upstream side of said intermediate permeator and for removing from said upstream side of said intermediate permeator a residue which is introduced into said upstream side of said second permeator, and means for removing from said downstream side of said intermediate permeator an excess of said less permeable component.

* * * * *